Dec. 3, 1957  N. W. HESS ET AL  2,814,834
METHOD OF MAKING DIPPED GOODS

Filed Nov. 13, 1953  2 Sheets-Sheet 2

INVENTORS
NEWMAN W. HESS
WILLIAM F. DACY
BY James J. Long
AGENT

United States Patent Office 2,814,834
Patented Dec. 3, 1957

2,814,834

METHOD OF MAKING DIPPED GOODS

Newman W. Hess, Naugatuck, and William F. Dacey, Waterbury, Conn., assignors to United States Rubber Company, New York, N. Y., a corporation of New Jersey Application November 13, 1953, Serial No. 391,846

3 Claims. (Cl. 18—58.6)

This invention relates to a method of making dipped goods and, more particularly, the invention is concerned with a method of making dipped goods comprised of polyurethane elastomer.

The principal object of the invention is to provide a more convenient and more economical method of fabricating articles from rubbery polyurethane elastomer, derived from a polyester and a diisocyanate.

Another object is the provision of a method of making shaped articles of polyurethane elastomer that utilizes an intermediate reaction product in a liquid state, and converts such liquid intermediate into a solid, rubbery state after a shaping operation.

Still another object of the invention is the provision of a method of forming rubbery polyurethane elastomer in a desired shape by a dipping operation that results in uniformly shaped articles of controlled thickness.

It is still a further object to provide a method of forming dipped articles of polyurethane elastomer utilizing a dipping form having such surface characteristics that it is uniformly and thoroughly wetted by a polyester-diisocyanate intermediate reaction product.

Additional objects and advantages of the invention will be made manifest in the following detailed description, which is intended to be read with reference to the accompanying drawing, wherein Fig. 1 is a flow diagram representing one method of practicing the invention in making footwear;

Figure 1:
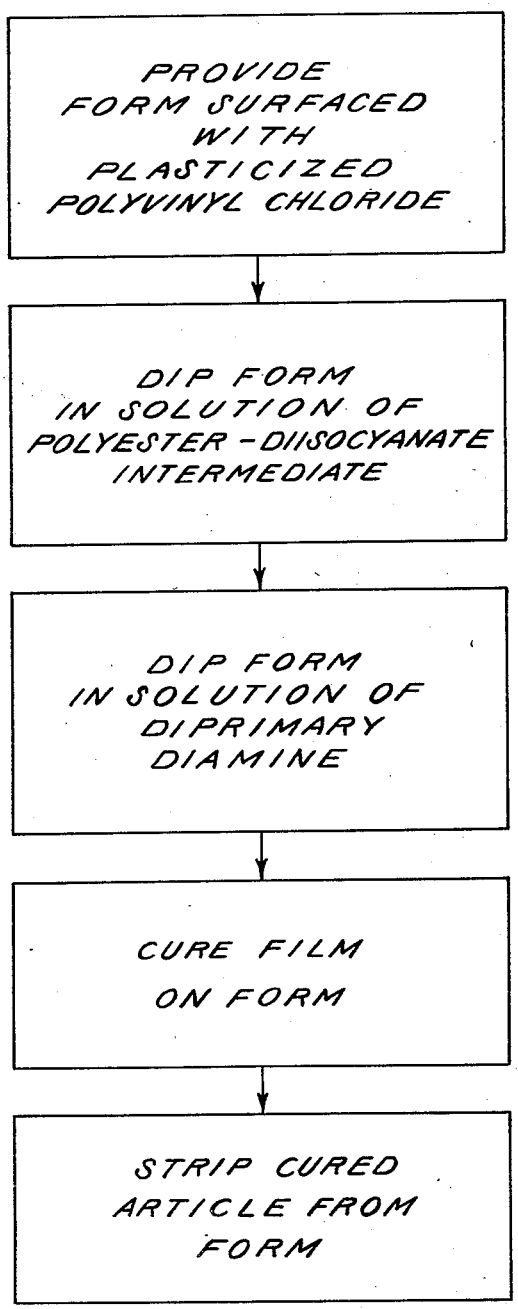
Figure 2:
Fig. 2 is a side elevational view of a dipping form suitable for use in the invention.
Figure 3:
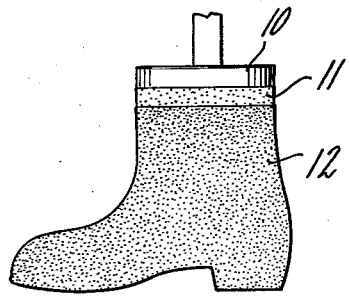
Fig. 3 is a similar view of the dipping form having a liquid intermediate applied thereto.

The invention is based upon the discovery that dipped articles of controlled thickness and of uniform, smooth appearance can be produced by dipping a suitably shaped form successively in a liquid polyester-diisocyanate intermediate reaction product and a diprimary diamine. The action of the diprimary diamine on the polyester-diisocyanate intermediate on the form is such that the intermediate is converted into a cured, non-tacky rubbery condition, and the resulting article is characterized by unusual tensile strength and great resistance to wear, even though the finished article may be extremely thin. The invention utilizes a dipping form made of a material that is easily uniformly wet by the polyester-diisocyanate intermediate composition, thereby insuring that a uniform film, free of voids or irregularities, is deposited.

The polyester-diisocyanate intermediate product employed in the invention is prepared in a liquid state from a linear chain-extended polyester made from a glycol, for example, a mixture of ethylene and propylene glycols, and an aliphatic saturated dicarboxylic acid, for example, adipic acid, using an excess of glycol over the acid so that the resulting polyester contains terminal alcoholic hydroxyl groups. Usually such an amount of glycol is used as to give a polyester having a hydroxyl number of 20 to 120, and preferably 36 to 67, and a low acid value less than 2 and preferably less than 1. The molecular weight of the polyester preferably ranges from 1700 to 3000. This polyester is reacted with a diisocyanate, for example, naphthylene 1,5-diisocyanate or p,p'-diphenylmethane diisocyanate, using a considerable molar excess, commonly from a 20% to a 250% and preferably from a 50% to a 100% molar excess, of the diisocyanate over that amount which would be required to react with all of the alcoholic hydroxyl groups furnished by the polyester. The reaction is frequently effected by heating a mixture of the polyester and the diisocyanate under anhydrous conditions at an elevated temperature, e. g., 70–150° C., to form a soluble, uncured, liquid material which is a linear polyurethane having terminal isocyanate groups. The diisocyanates employed in preparing the liquid polyester-diisocyanate intermediate may be represented by the general formula OCN—R—NCO, where R is a divalent hydrocarbon radical, as in polymethylene diisocyanates such as ethylene diisocyanate, hexamethylene diisocyanate and tetramethylene diisocyanate, alkylene diisocyanates such as propylene-1,2-diisocyanate, cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthalene diisocyanate, in which category we include aliphatic-aromatic diisocyanates such as p,p-diphenylmethane diisocyanate and phenylethylene diisocyanate

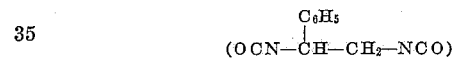

$$\text{(OCN—CH—CH}_2\text{—NCO)}$$
with $C_6H_5$ on the CH

The invention contemplates application of a solution of such a polyester-diisocyanate intermediate by dipping a suitably shaped form into the solution. After removal of the form from the solution, the polyester-diisocyanate intermediate is treated on the form with a diprimary diamine, whereby it is converted to a tack-free condition, by a chemical reaction that is apparently analogous to a curing or vulcanizing action, and converts the polyester-diisocyanate into a rubbery polyurethane that has the typical properties of a cured elastomer, and is exceptionally strong. Since the resin is now insoluble in the solvent, the solvent evaporates very rapidly.

The diprimary diamines suitable for this purpose may be represented by the general formula $NH_2$—A—$NH_2$, where A is a divalent organic radical in which the terminal atoms are carbon, and which is preferably devoid of groups reactive with diisocyanate, that is, the two primary amino groups are preferably the sole groups in the molecule that will react with the diisocyanate groups of the polyester-diisocyanate, to provide the desired curing action. In the preferred diprimary diamines employed in the invention the two primary amino groups are linked by a divalent hydrocarbon radical, and such radical may be aliphatic, cyclo-aliphatic, aromatic, or any combination thereof, as in hexamethylene diamine, 1,4-diamino cyclohexane, m- or p-phenylene diamine, 4,4'-diamino diphenylmethane, p(beta-aminoethyl) aniline, 4-(beta-aminoethyl) cyclohexylamine, and p(4-aminocyclohexyl) aniline. However, the connecting radical between the two essential primary amino groups need not be purely a hydrocarbon, but may contain other atoms in addition to carbon and hydrogen, as in 3,3'-diamino dipropyl ether, diamino diphenyl ether and diamino dibutyl sulfide.

The diprimary diamine is also preferably applied by dipping the form in a solution of the diamine in a volatile organic solvent. The diamine may be applied to the form before the form is dipped in the polyester-diisocyanate intermediate solution, or after the form has been coated with the polyester-diisocyanate. In some cases, it may be advantageous to apply the diamine both before and after applying the polyester-diisocyanate intermediate. Usually we find it advantageous to apply the polyester-diisocyanate intermediate in more than one coat, alternately with interspersed coatings of diamine.

The solvent employed as a vehicle for the polyester-diisocyanate and the diprimary diamine is in no way critical, and may be any inert, volatile, organic liquid in which these materials are soluble. Numerous different common organic solvents will readily dissolve the materials, and those skilled in the art will therefore have no difficulty in selecting an appropriate solvent. Among the kinds of solvents suitable for use in the process may be mentioned hydrocarbons such as benzene, halogenated compounds such as methylene chloride, and ketones such as acetone. The preferred solvents are those which evaporate more slowly, i. e. those boiling above 130° F., but the solvent should not be too high boiling, i. e., it should not have a boiling point in excess of 230° F., otherwise it will not be removed readily. Generally, more uniform films result from the use of such less volatile solvents, than are obtained from very low boiling solvents.

The nature of the surface of the dipping form is of paramount importance, since the form must be surfaced with a material that will not adhere to the polyurethane rubber, so that the cured film is easily removable from the form. Also, it is necessary that the form have such surface characteristics that it is readily uniformly wet by the polyester-diisocyanate intermediate solution, so that a complete and continuous film is formed on the surface. Although a polished chromium surface fulfills these requirements, such a surface is comparatively expensive and difficult to prepare. We have now found that the requirements are admirably fulfilled by utilizing a form surfaced with plasticized polyvinyl chloride. Thus, the form may be made up of a suitably shaped plasticized polyvinyl chloride mass, or the form may be comprised of a core of metal or other material, surfaced with plasticized polyvinyl chloride. On such a surface, the solution of polyester-diisocyanate spreads evenly and forms a continuous film that adequately covers all edges and crevices, and yet the cured polyurethane film does not tend to stick to such a surface, but can be stripped off readily without injury. Plasticized polyvinyl chloride is a known material, prepared by mixing polyvinyl chloride with such liquid plasticizers as dioctyl phthalate, as is well understood by those skilled in the art. In practice the vinyl chloride polymer is sometimes modified by copolymerizing a small amount of another monomer such as vinyl acetate with the vinyl chloride, or a small amount of another polymer such as polyvinyl acetate may be mixed with the polyvinyl chloride.

The amount of polyester-diisocyanate deposited on the form in any one dipping operation is preferably only very small, since thinner films of the intermediate can be cured more rapidly by the action of the diamine, and there is no difficulty from distortion or wrinkling of thin films during the cure. The amount of polyester-diisocyanate deposited can be controlled by regulating the viscosity of the solution, and this, in turn, can be varied by varying the concentration of the polyester-diisocyanate, as well as by varying the temperature of the dipping form. Usually, we employ solutions containing from about 10% to 80% of the polyester-diisocyanate, depending on the temperature of the form. At room temperature, we prefer to use the less concentrated solutions, whereas if the form is pre-heated to a temperature of, for example, about 150–160° F., we usually use more concentrated solutions. In this way, we deposit in a single dip a film having a gauge of about 0.001 to 0.002 inch. The thus-deposited film of polyester-diisocyanate intermediate is cured to a non-tacky state, after dipping in the solution of diprimary diamine, within about one or two minutes at room temperature, although we prefer to permit the film to remain on the form for an additional one or two hours before stripping it. Although the film is substantially cured at this point, further improvement in the physical properties of the film is noted over a period of a week or so. The curing process can be accelerated by placing the form in a heated chamber having a temperature of, for example, 120° F. to 300° F., after removal from the diamine solution.

The following example will serve to illustrate the practice of the invention in more detail.

*Example*

The essential steps of this example may be followed with reference to Fig. 1.

An aluminium last 10 was coated on its outer surface with a film 11 of plasticized polyvinyl chloride resin, deposited thereon by applying a fluid plastisol, and heating to set the plastisol. The outer surface of the polyvinyl chloride film bore a pattern corresponding to the desired external contour of a gaiter or overshoe.

The form was dipped at room temperature into a 25% by volume solution of polyester-diisocyanate intermediate in methyl isobutyl ketone. The polyester-diisocyanate intermediate was derived from a polyester made by heating the following mixture at 220–230° C.:

| | Mols |
|---|---|
| Propylene glycol | 11 |
| Ethylene glycool | 4.25 |
| Adipic acid | 11.25 |

The propylene glycol results in an alkyl of lower melting point and lower viscosity. In the course of the preparation of the polyester the unreacted glycol was removed by vacuum distillation, and the extent of the distillation determined the molecular weight of the polyester, as calculated from the acid number and the hydroxyl number. The polyester used in this example had a molecular weight of about 2400, and a hydroxyl number of about 60 and an acid number less than 1. This alkyd was mixed at a temperature of 85° C. with an excess of p,p′-diphenylmethane disocyanate in the proportions of 80 parts of the polyester to 20 parts of the diisocyanate. A reaction occurred between the hydroxyl groups of the alkyd and the isocyanate groups to form a polyurethane intermediate characterized by the presence of unreacted isocyanate groups. This intermediate was a liquid and was soluble in the common organic solvent such as acetone. The form remained in this solution for about 30 seconds, to insure thorough wetting of the form, and then it was very carefully and slowly removed so as not to disturb the film or cause running thereof. In this way a film 12 of polyester-diisocyanate intermediate having a thickness of about 0.001 inch was deposited.

The last was then dipped in a 5% solution of 4,4′-diamino diphenylmethane in methyl isobutyl ketone. The form was allowed to remain in this solution for 30 seconds, and it was then very carefully removed as before. After one minute the thus applied diprimary diamine had cured the polyester-diisocyanate to a non-tacky state.

After about 10 or 15 minutes the foregoing dipping cycle was repeated, until a total thickness of 0.002 inch had been deposited.

Figure 4:
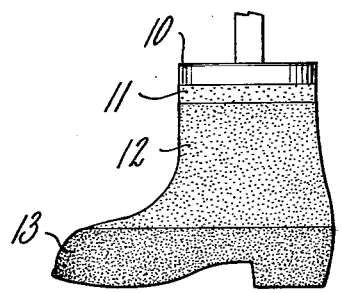
Fig. 4 is a similar view showing an additional layer of polyurethane rubber applied to certain portions.
Figure 5:
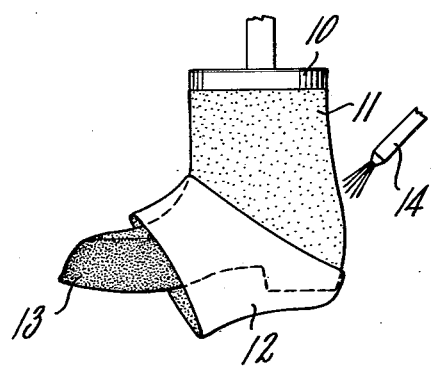
Fig. 5 is a similar view showing the cured polyurethane shoe being stripped from the dipping form; and, Fig. 6 is a similar view of the shoe after removal from the dipping form.
Figure 6:
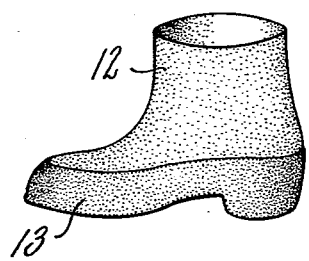

About 10 parts of a commercial molybdate orange pigment paste was then carefully dispersed in 100 parts of the polyester-diisocyanate intermediate, and a dipping bath comprised of a 25% solution of the thus-colored intermediate was used in two successive cycles, in which only the lower portion of the form was dipped according to the foregoing procedure, to provide a portion 13 (Fig. 4) of greater thickness, namely, 0.012 to 0.014 inch at the lower area of the shoe.

After standing for one hour on the form the shoe was stripped from the form with the aid of an air jet 14. After aging seven days, the breaking strength of the portion of the film that was 0.002 inch thick, was 4800 pounds per square inch.

From the foregoing it will be apparent that the invention provides a convenient and economical means for making dipped articles, such as overshoes, rubber gloves, and the like of polyurethane rubber. Because of the unusual strength and wear-resistance of the resulting films, even in very thin gauges, overshoes and the like of extremely light weight and portability can be made of polyurethane rubber by this method. Thus, men's rubbers made by this method can be folded into a package the approximate size of a package of book matches, and the amount of material contained in the rubbers is so small that they can be marketed as an inexpensive item intended for one-time use, after which they can be discarded. At the same time, if it is desired to produce a heavier and longer lasting article, this can be done by increasing the amount of material deposited.

Having thus described our invention, what we claim and desire to protect by Letters Patent is:

1. A method of making a dipped article of a polyurethane elastomer comprising providing a solution in an inert volatile organic solvent of a normally tacky liquid intermediate reaction product of (1) a polyester having a hydroxyl number of from 20 to 120 and acid value less than 2, with (2) a 20% to a 250% molar excess of a diisocyanate, said intermediate reaction product containing unreacted isocyanate groups, providing a solution of a diprimary diamine in an inert volatile organic solvent, providing a form of a desired shape having a surface that is wettable by said solution of said intermediate reaction product and to which the polyurethane elastomer will not adhere, dipping the said form alternately in said solutions, whereby there is deposited on the form a film of said intermediate reaction product that is converted into a solid non-tacky cured condition on the form by the action of the diamine, and thereafter stripping the resulting polyurethane article from the form.

2. A method of making a dipped article of poly-urethane elastomer comprising providing a form of the desired shape surfaced with plasticized polyvinyl chloride, dipping said form in a solution in an inert volatile organic solvent of a normally tacky liquid intermediate reaction product of (1) an ethylene and propylene glycol-adipic acid polyester having a hydroxyl number of from 36 to 67, an acid value less than 1, and a molecular weight of from 1700 to 3000, with (2) a 50% to 100% molar excess of p,p'-diphenylmethane diisocyanate, said intermediate reaction product containing unreacted isocyanate groups, removing the form from said solution, evaporating the solvent from the film thereby deposited on the form, thereafter dipping the form into a solution of 4,4'-diamino diphenylmethane in an inert volatile organic solvent, removing the form from said solution, evaporating the solvent from the film of said diamine thus deposited over the film of said intermediate reaction product, said diamine diffusing into the said film of intermediate reaction product and causing the intermediate reaction product to be cured to a non-tacky state, and thereafter stripping the resulting polyurethane article from the form.

3. A method of making a dipped article of polyurethane elastomer comprising providing a form of the desired shape surfaced with polished chromium, dipping said form in a solution in an inert volatile organic solvent of a normally tacky liquid intermediate reaction product of (1) an ethylene and propylene glycol-adipic acid polyester having a hydroxyl number of from 36 to 67, an acid value less than 1, and a molecular weight of from 1700 to 3000, with (2) a 50% to 100% molar excess of p,p'-diphenylmethane diisocyanate, said intermediate reaction product containing unreacted isocyanate groups, removing the form from said solution, evaporating the solvent from the film thereby deposited on the form, thereafter dipping the form into a solution of 4,4'-diamino diphenylmethane in an inert volatile organic solvent, removing the form from said solution, evaporating the solvent from the film of said diamine thus deposited over the film of said intermediate reaction product, said diamine diffusing into the said film of intermediate reaction product and causing the intermediate reaction product to be cured to a non-tacky state, and thereafter stripping the resulting polyurethane article from the form.

References Cited in the file of this patent

UNITED STATES PATENTS

| | | |
|---|---|---|
| 1,678,117 | Homberg | July 24, 1928 |
| 2,525,272 | Rhoton | Oct. 10, 1950 |
| 2,542,353 | Picard | Feb. 20, 1951 |
| 2,621,166 | Schmidt | Dec. 9, 1952 |